(No Model.) 2 Sheets—Sheet 2.
J. W. HUMPHREYS.
DITCHING MACHINE.
No. 436,241. Patented Sept. 9, 1890.
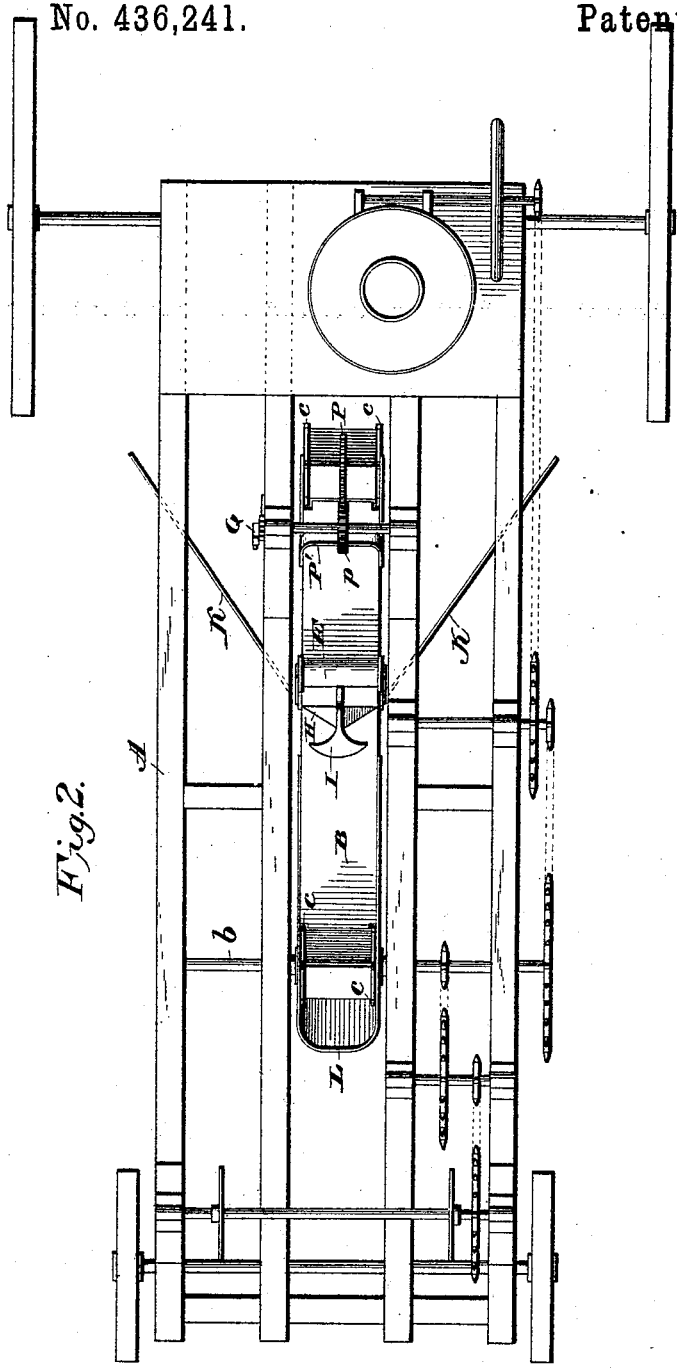
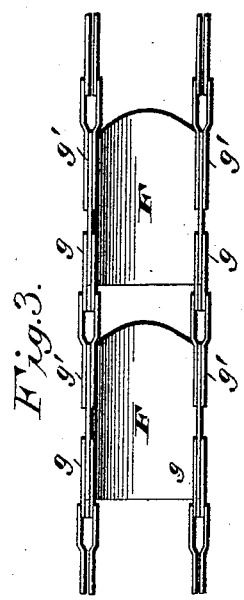
Witnesses
G. S. Elliott.
E. M. Johnson
James W. Humphreys
Inventor
by
Attorney

# UNITED STATES PATENT OFFICE.

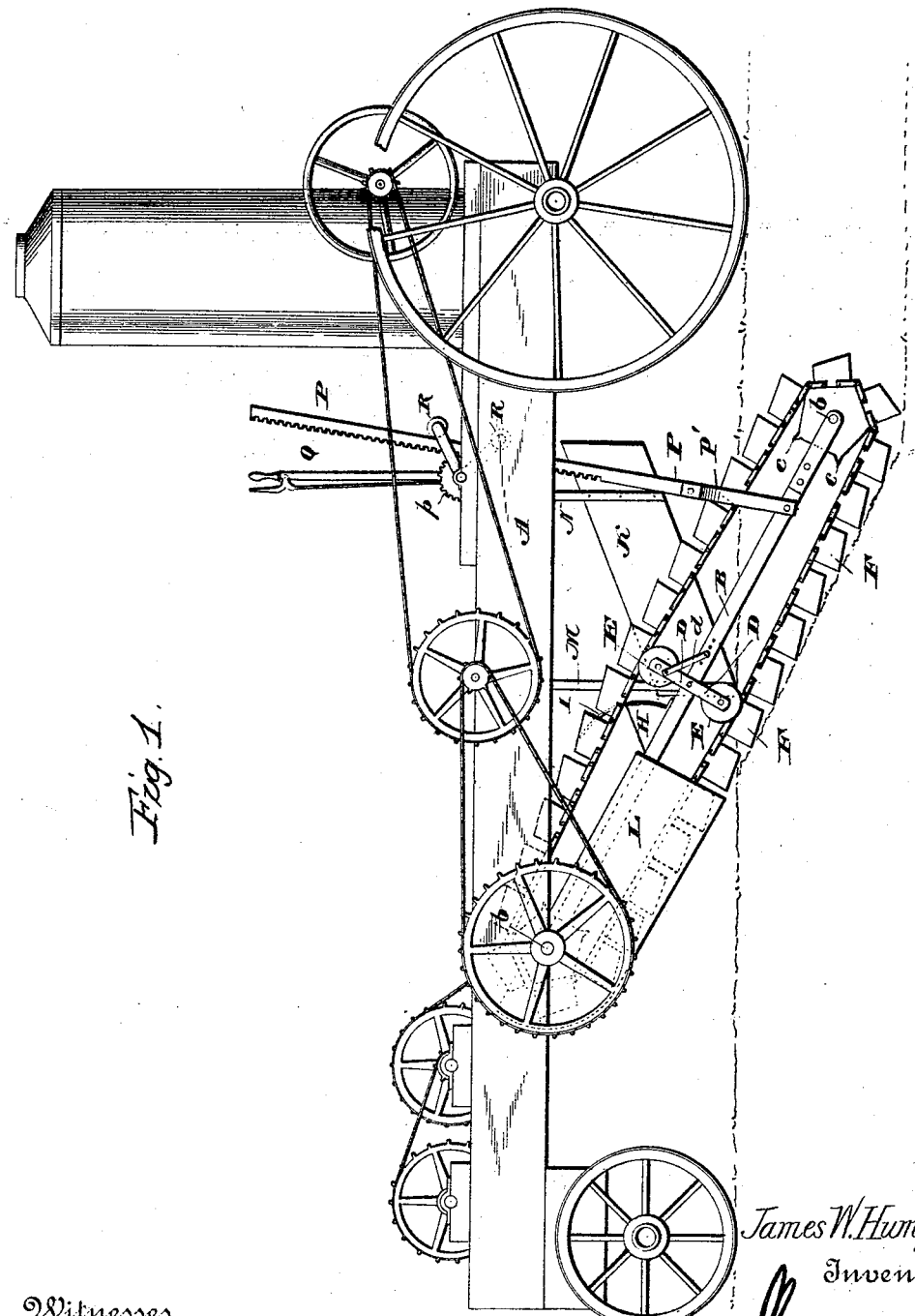

JAMES W. HUMPHREYS, OF IROQUOIS, ILLINOIS.

DITCHING-MACHINE.

SPECIFICATION forming part of Letters Patent No. 436,241, dated September 9, 1890.

Application filed May 29, 1890. Serial No. 353,619. (No model.)

*To all whom it may concern:*

Be it known that I, JAMES W. HUMPHREYS, a citizen of the United States of America, residing at Iroquois, in the county of Iroquois and State of Illinois, have invented certain new and useful Improvements in Ditching-Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to certain new and useful improvements in ditching-machines.

The object of the present invention is to provide a carrying-frame with an endless excavating-belt which is adjustable vertically, and is adapted to dig the ditch, convey the earth taken therefrom, and deposit it on each side of the ditch.

My invention also comprises means for tightening the belt and adjusting the same vertically, all as will be hereinafter fully set forth.

In the accompanying drawings, forming a part of this specification, Figure 1 is a side view of a ditching-machine constructed in accordance with my invention, one of the mold-boards or pushers being left off. Fig. 2 is a plan view, and Fig. 3 is a detail view, of the excavating-belt.

A refers to the frame of the apparatus, which is mounted on wheels and provided at suitable points with journal-boxes for transverse shafts carrying sprocket-wheels for operating the endless excavating-belt, and also for drawing the apparatus, these parts being arranged somewhat similar to what is shown in my prior patents.

B refers to a beam, the ends of which are bifurcated or provided with extensions in which are journaled transverse shafts $b$ and $b'$, upon which are rigidly secured blocks having projections or teeth $c$, which enter between the connecting-links of the endless excavating-belt. At about the center of this beam are secured bars D, which carry rollers E, over which the endless chain passes, so as to keep said chain taut, and by changing the angles of the bars D the chain can be tightened as it stretches in use. This adjustment can be made by employing bars $d\ d$, which are suitably attached near the ends of the bars D, and connect with the beam B, so as to be adjusted thereon.

The buckets or conveyers F are practically semicircular in cross-section and slightly tapered, as shown in Fig. 1, so that the front edges thereof will better enter the soil and carry the same without the necessity of closing the rear ends of said buckets, and the upper edges of these buckets have riveted or otherwise secured thereto links $g\ g$ and $g'$.

To the upper edge of the beam B, at a slight distance in front of the tightening-rollers E E, is secured a plate or deflector H, the sides of which are tapered downwardly and rearwardly, and from the rear end of this plate projects a curved scraper I, which is adapted to pass between the links of the chain and remove the earth from the buckets, so that it will fall in front of the deflector H, and be deposited at the side of the ditch in front of the mold-board or pusher K. The sides of the deflecting-plate incline downwardly and outwardly, the rear portions thereof being the full width of the beam B.

L refers to a bent U-shaped plate, which curves upwardly at its front end and is secured to the beam B to extend slightly above the same, so that the earth when it falls upon the upper portion of said bar will be guided downwardly to the deflector H. The buckets F move upwardly through this trough or plate L.

M refers to standards, which are suitably secured to the frame A, each of said standards having attached thereto mold-boards or pushers K, the lower edges of which are inclined, so that the rear outer lower edges will be higher than the front portions, thus making a mound on each side of the ditch. The standards M and N, which support this mold-board, can be vertically adjustable, if desired.

P refers to a rack-bar, the lower end of which is bifurcated or provided with extensions P', which are pivotally connected near the lower end of the beam B. The upper portion of the rack-bar P engages with the pinion $p$, mounted on a suitable shaft and provided with an operating-lever Q, the lower end of which has a dog of ordinary construction for engaging with a pinion attached to the shaft carrying the pinion p, so that when said dog is in engagement the shaft can be turned to elevate or depress the rack-bar and the beam which carries the endless belt. The rack-bar P is held in engagement with the pinion p by rollers which are journaled to links loosely mounted on the shaft which carries the pinion.

The improved ditching-machine possesses several advantages which it is deemed unnecessary to enumerate over my prior patents, and is quite similar in construction, and by tapering the buckets they not only provide self-sharpening cutting-edges, but also dispense entirely with the necessity of closing the lower ends of said buckets, as the soil being wedged or packed in the buckets or scoops will be carried upwardly thereby until they turn over the sprocket-wheel mounted on the upper shaft b, and any dirt which may remain in the buckets or scoops will be removed by the finger I.

Having thus described my invention, what I claim as new, and desire to secure by Letters Patent, is—

1. In a ditching-machine, a vertically-adjustable beam B, pivoted at its front end to the carrying-frame, and provided with a bent plate or trough L, which depends from said beam beneath the scoops or buckets, and a deflector H, having rearwardly and downwardly inclined sides and an upwardly and forwardly projecting finger which enters the scoops, substantially as set forth.

2. The combination, in a ditching-machine, of a flat plate of substantially the same or greater width than the endless chain of excavating-scoops which pass around the same, means for vertically adjusting the lower end of said beam, a belt-tightener consisting of pivoted bars D, carrying rollers E E, a trough L, secured to the beam B, so that the upper edges extend above the same, a deflector H, also carried by said beam below the trough, and mold-boards or pushers for removing the earth from the edges of the ditch, substantially as set forth.

3. The combination, in a ditching-machine, of a frame A, carrying a motor, said motor being suitably geared to a drum and to a shaft for operating the excavating means, an endless belt of scoops or buckets mounted on a flat beam B, having upper and lower sprocket-wheels, said beam having adjusting means connected to the frame at its rear end, mold-boards or pushers K, supported by standards M and N on the main frame A, a trough L, the upper edges of which project above the beam B, and a deflector carried by the beam below the trough L, said deflector having a finger adapted to enter the scoops, the parts being organized substantially as shown, and for the purpose set forth.

4. In a ditching-machine, a vertically-adjustable beam B, pivoted at its front end to the carrying-frame, an endless belt carried by said beam and made up of a series of U-shaped buckets or scoops, said buckets or scoops tapering on their under side and provided at their parallel upper edges with links $g\ g'$, a bent plate or trough L on said beam and depending beneath the scoops or buckets, and a deflector H, having rearwardly and downwardly inclined sides and an upwardly and forwardly projecting finger which enters the scoops, substantially as set forth.

In testimony whereof I affix my signature in presence of two witnesses.

JAMES W. HUMPHREYS.

Witnesses:
DAVID H. ELY,
ANTON ELGAS.